United States Patent [19]
Manini et al.

[11] Patent Number: 5,544,490
[45] Date of Patent: Aug. 13, 1996

[54] DEVICE FOR MAINTAINING A VACUUM IN A THERMALLY INSULATING JACKET AND METHOD OF MAKING SUCH DEVICE

[75] Inventors: Paolo Manini, Arluno; Fortunato Belloni, Villastanza di Parabiago, both of Italy

[73] Assignee: SAES Getters S.p.A, Milan, Italy

[21] Appl. No.: 479,343

[22] Filed: Jun. 6, 1995

[30] Foreign Application Priority Data

Jul. 7, 1994 [IT] Italy .................. MI94A1415

[51] Int. Cl.⁶ .................................................. F17C 11/00
[52] U.S. Cl. .......................... 62/46.1; 417/48; 252/181.1
[58] Field of Search ....................... 62/46.1, 46.2, 62/46.3, 45.1, 51.1; 417/48; 252/181.1

[56] References Cited

U.S. PATENT DOCUMENTS

| | | | |
|---|---|---|---|
| 5,012,102 | 4/1991 | Gowlett | 62/51.1 X |
| 5,191,980 | 3/1993 | Boffito et al. | 206/524.4 |
| 5,312,606 | 5/1994 | Boffito et al. | 423/210 |
| 5,365,742 | 11/1994 | Boffito et al. | 62/46.1 X |
| 5,375,423 | 12/1994 | Delatte | 62/45.1 |
| 5,408,832 | 4/1995 | Boffito et al. | 62/46.2 X |

FOREIGN PATENT DOCUMENTS

| | | | |
|---|---|---|---|
| 1000665 | 3/1983 | U.S.S.R. | 62/46.2 |
| 1532770 | 12/1989 | U.S.S.R. | 62/46.2 |
| 1198600 | 7/1970 | United Kingdom . | |
| WO93/25843 | 12/1993 | WIPO . | |
| WO95/16166 | 6/1995 | WIPO . | |

*Primary Examiner*—Christopher Kilner
*Attorney, Agent, or Firm*—Hickman Beyer & Weaver

[57] ABSTRACT

A device for maintaining a vacuum in a thermally insulating jacket is described. The device comprises a container formed of a gas-tight material, preferably aluminum, which has an opening to the atmosphere. Inside the container is a first pellet comprising a powder of a Ba—Li alloy getter material. Arranged above, and completely covering, the first pellet is a second pellet comprising a powder of a drying material, optionally including the oxide of a noble metal and a material to prevent contraction of the drier. A process for manufacturing such a device is also described in which the first pellet is obtained by compression of its constituent powders at a pressure between about 30 bar and 1000 bar.

15 Claims, 3 Drawing Sheets

DEVICE FOR MAINTAINING A VACUUM IN A THERMALLY INSULATING JACKET AND METHOD OF MAKING SUCH DEVICE

CLAIM OF PRIORITY PURSUANT TO 35 U.S.C. § 119

This application claims priority under 35 U.S.C. § 119 from Italian Patent Application Serial No. MI94A 001415, filed Jul. 7, 1994, which is incorporated herein by reference.

BACKGROUND OF THE INVENTION

1. The Field of the Invention

The present invention relates to devices for creating and maintaining vacuums. In particular, the present invention relates to a device for maintaining a vacuum in a thermally insulating jacket and to a process for manufacturing such a device.

2. The Background Art

Vacuum jackets are commonly employed for the storage and transportation of temperature-sensitive materials, such as cryogenic fluids (e.g., liquid nitrogen), and the creation and maintenance of controlled-temperature devices (e.g., refrigerators). Often, such vacuum jackets contain additional insulating materials such as glass wool, colloidal silica, perlite, or organic polymers in the form of foams (e.g., open, cell-rigid polyurethanes) or multilayers (i.e., alternating sheets of organic polymers, such as polyolefins, preferably cross-linked polyolefins, and aluminized plastics).

Unfortunately, the vacuum present initially in a vacuum jacket deteriorates as a consequence of various phenomena. For example, deterioration of the vacuum can result from the ingress of gases such as $CO$, $CO_2$, $O_2$, $H_2$, $H_2O$, or $N_2$ into the interior vacuum space of the jacket, usually by absorption at the welding joints of the walls of the jacket. In addition, organic vapors can be released from the above-described insulating materials, or from the materials forming the walls of the jacket. Also, in cases where the walls of the vacuum jacket are made of plastic, permeation through the jacket walls of gases, in particular, atmospheric gases, often occurs.

The deterioration of the jacket's interior vacuum can be alleviated at least partially by placing into the interior of the vacuum jacket materials capable of abstracting one or more of the above-listed gases. These materials are described generally as physical or chemical sorbers. Physical sorbers act according to the principle of physical adsorption in which gases adhere to the surface of the sorbing material as a result of weakly attractive forces between the material surface and the gas molecule. Materials that function as physical sorbers include, among others, zeolites, molecular sieves, and activated carbon. However, the sorption of gases by physical sorbers is generally reversible if the adsorbing material undergoes an increase in temperature. Thus, physical sorbers are not particularly well suited for vacuum jackets used to provide thermal insulation as such jackets are subject to changes in temperature during their use. For example, dewars used for the containment of liquid gases, such as liquid nitrogen, must be capable of withstanding changes in temperature between room temperature, typically the temperature of the empty dewar, and about −196° C., the temperature of liquid nitrogen.

More preferable sorbing materials for use in vacuum jackets are chemical sorbers, materials that sorb and fix gases irreversibly by chemical reaction. Example of such materials include drying agents that are effective to abstract water vapor ($H_2O$), and getter materials that can isolate gases such as carbon monoxide ($CO$), carbon dioxide ($CO_2$), molecular oxygen ($O_2$), molecular hydrogen ($H_2$), $H_2O$, or molecular nitrogen ($N_2$), in addition to water vapor.

The use of chemical sorbers is described, for example, in PCT Application Serial No. WO 93/25843, incorporated herein by reference. This publication describes the combination of a drying agent, selected from barium oxide, strontium oxide, phosphorus oxide and their mixtures, and a getter material comprising an alloy of barium and lithium, and, in particular, the barium-aluminum alloy having the stoichiometric formula $BaLi_4$. Although $BaLi_4$ has the capacity to sorb each of the gases indicated above, the great affinity of $BaLi_4$ for water vapor weakens its ability to abstract other gases. Hence, at least one of the above-described drying compounds is added to remove water vapor from the mixture of gases coming into contact with the getter material to preserve the sorption capacity of the getter material for other gases. Optionally, an oxide of a noble metal, preferably palladium oxide (PdO), can be included with the getter material and drying agent to convert traces of $H_2$ into $H_2O$ which is then fixed by the drying compound.

Also mentioned in the above-identified PCT application, in quite general terms, is the possibility that the drying agent and getter material might be placed inside a container and separated by a porous septum to form a device that can be used to maintain a vacuum. However, this disclosure does not account for the practical problems of preparing and handling such a device. In particular, at room temperature the drying agent and getter materials described in the above-identified PCT application are highly reactive towards the ambient atmosphere and must be isolated until their use. Also, these materials must be activated by heating to temperatures as high as 150° C. while the jacket is maintained at a pressure of less than 5 Pascals (Pa). Such activation conditions can induce the release of gases into the vacuum space from jacket walls made of plastic.

U.S. Pat. No. 5,191,980 describes a mechanical device for protecting the sorbing materials from the environment until their use. The device holds a getter material hermetically sealed by a film of thermo-retractable material, such as a vinyl chloride resin. The getter material is exposed to the inner atmosphere of the jacket by heating to cause retraction and rupture of the thermo-retractable film. Again, however, the thermal treatment necessary to retract the thin film may not be compatible with the materials that comprise the jacket. Therefore, it would be advantageous to provide a device for maintaining a vacuum in a thermally insulating jacket that does not require heat activation. It would also be advantageous to provide a device that can be exposed to the atmosphere for a reasonable period of time and retain its effectiveness.

SUMMARY OF THE INVENTION

The present invention provides a device for maintaining a vacuum in a thermally insulating vacuum jacket that does not require heat activation. The device of the present invention can also be exposed to the external atmosphere for periods as long as 15 minutes while remaining effective to maintain vacuum conditions in a vacuum jacket. Thus the present invention will be seen to provide a device that avoids the above-described difficulties regarding the use of heat- and air-sensitive materials in the maintenance of vacuums in vacuum jackets.

In one aspect, the present invention provides a device for maintaining a vacuum in an enclosed space. The device comprises a substantially gas-impermeable container having open and closed ends. A first pellet of a getter material including a Ba—Li alloy is located in the container, proximate to the closed end. A second pellet including a drying agent is located in the container proximate to the open end. The second pellet also substantially covers the first pellet. The device is capable of maintaining a nitrogen sorption rate of at least about one cubic centimeter/second after exposure to air for fifteen minutes.

In one embodiment, the Ba—Li alloy has the stoichiometric formula $BaLi_4$. In another embodiment, the drying agent is selected from the group consisting of barium oxide, strontium oxide and phosphorus oxide. In still another embodiment, the second pellet also includes a noble metal oxide selected from the group consisting of silver oxide, osmium oxide, iridium oxide, ruthenium oxide, rhodium oxide and palladium oxide and their mixtures. The second pellet further includes an anti-contraction material selected from the group consisting of alumina, zeolites and activated carbon in yet another embodiment of the invention.

In another aspect, the present invention provides a method for manufacturing a device for maintaining a vacuum. According to the method of the invention, a substantially gas-impermeable container having open and closed ends is provided. A powder including a Ba—Li getter alloy is compressed at a pressure of between about 30 bar and about 1000 bar to form a first pellet which is located in the container, proximate to the closed end of the container. A second pellet including a drying agent is also located in the container proximate to the open end such that the second pellet covers substantially the first pellet. The device thus formed is capable of maintaining a nitrogen sorption rate of at least about one cubic centimeter/second after exposure to air for fifteen minutes.

In one embodiment, the pressure applied to compress the Ba—Li alloy is between about 150 bar about 300 bar. In another embodiment, the Ba—Li alloy has the stoichiometric formula $BaLi_4$. In yet another embodiment, the drying agent is selected from the group consisting of barium oxide, strontium oxide and phosphorus oxide and their mixtures. In still another embodiment, the second pellet further includes a noble metal oxide selected from the group consisting of silver oxide, osmium oxide, iridium oxide, ruthenium oxide, rhodium oxide and palladium oxide. An anticontraction agent selected from the group consisting of alumina, zeolites and activated carbon can also be included with the second pellet.

These and other aspects and advantages of the present invention will become more apparent when the Description below is read in conjunction with the accompanying Drawings.

Figure 1:
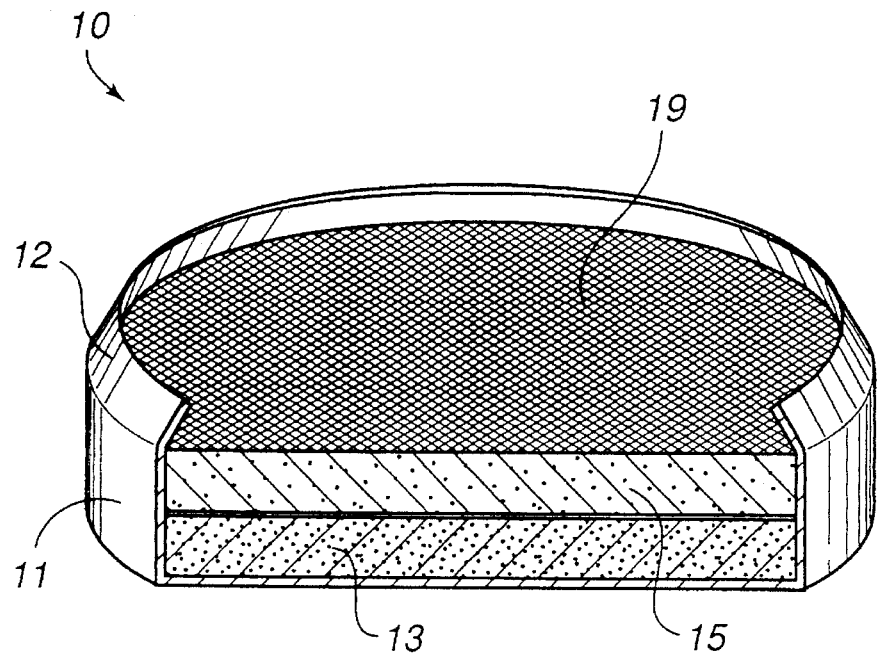
FIG. 1 is a perspective view of a cross-section of a first device for maintaining a vacuum in accordance with the present invention.

for each gram of alloy before and after exposure of the alloy to air for a period of 15 minutes. Curve "1" illustrates the sorption speed of the alloy measured before exposure of the alloy to air. Curve "2" illustrates the sorption speed measured after exposure.

DESCRIPTION OF SPECIFIC EMBODIMENTS

FIG. I illustrates a device 10 for maintaining a vacuum according to the invention. Device 10 comprises a cylindrical container 11 having open and closed ends and dimensioned to hold a first pellet 13 of a getter material (described below) and a second pellet 15 of a drying material (also described below), also referred to herein as a "dryer". A net of polymeric material 19 (described below) covers the outward facing surface of second pellet 15. Suitable materials for container 11 include gas-impermeable materials, e.g., metals, or composite materials formed of plastic sheets coated with metal or multilayers of plastic/metal. Due to their malleability, metals such as stainless steel or aluminum are preferred. A particularly preferred metal is aluminum which is light, easily formable in sheets and cold-drawable. Containers fashioned from aluminum can be between about 0.1 millimeters (mm) and about 0.3 mm in thickness. The construction of such containers will be familiar to those of skill in the container arts.

Figure 2:
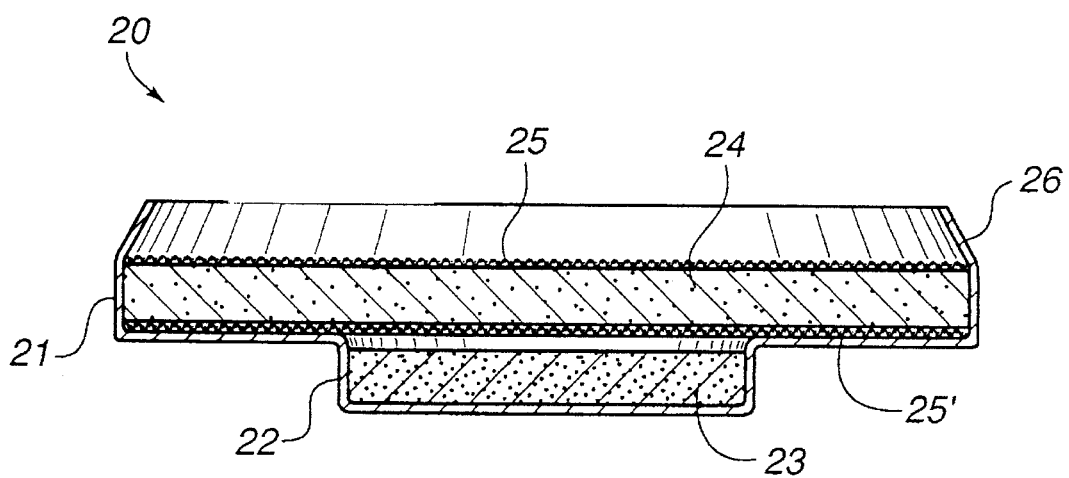
FIG. 2 is a cross-section view of a second device for maintaining a vacuum in accordance with the present invention.

The container may be of any shape that allows getter material pellet 13 to be completely covered by drying material pellet 15. In one embodiment, the pellets are placed in a single cylindrical container 11 as shown in FIG. 1, wherein the first pellet is located proximate to the closed end of the container and the second pellet is located proximate to the open end of the container such that the second pellet substantially covers the first pellet. In an alternative embodiment, the pellets are located in separate coaxial cylindrical portions 21 and 22 as shown in FIG. 2, in which the first pellet is proximate to the closed end of the container and the second pellet is proximate to the open end of the container, substantially covering the first pellet. The container can also include one or more means for retaining the pellets within the interior of the container. In one embodiment, the container includes a hollow, frustaconical upper portion, such as shown in FIG. 1 at 12 and in FIG. 2 at 26, to stabilize and retain the pellets within the device. Other means for retaining the pellets with the device will be apparent to those of skill in the container arts.

FIG. 2 shows in cross-section a device 20 according to an alternative embodiment of the present invention. According to the embodiment shown, the getter material and dryer pellets are of different diameters. Device 20 comprises a first cylindrical portion 22 and a second cylindrical portion 21. The container can be made from standard materials and methods. First portion 22 houses a first pellet 23 of getter material proximate to the closed end of the container. Above the first pellet is positioned a second pellet 24 of dryer material located in second cylindrical portion 21 proximate to the open end of the container. In the illustrated embodiment, second pellet 24 is held between two discs of a polymeric material net 25 and 25'(described below). In addition, the container includes a hollow, frustaconical upper portion 26 to keep the pellets in position. Again, those of skill will recognize that other methods may be used to maintain the first and second pellets within the container.

Figure 2A:
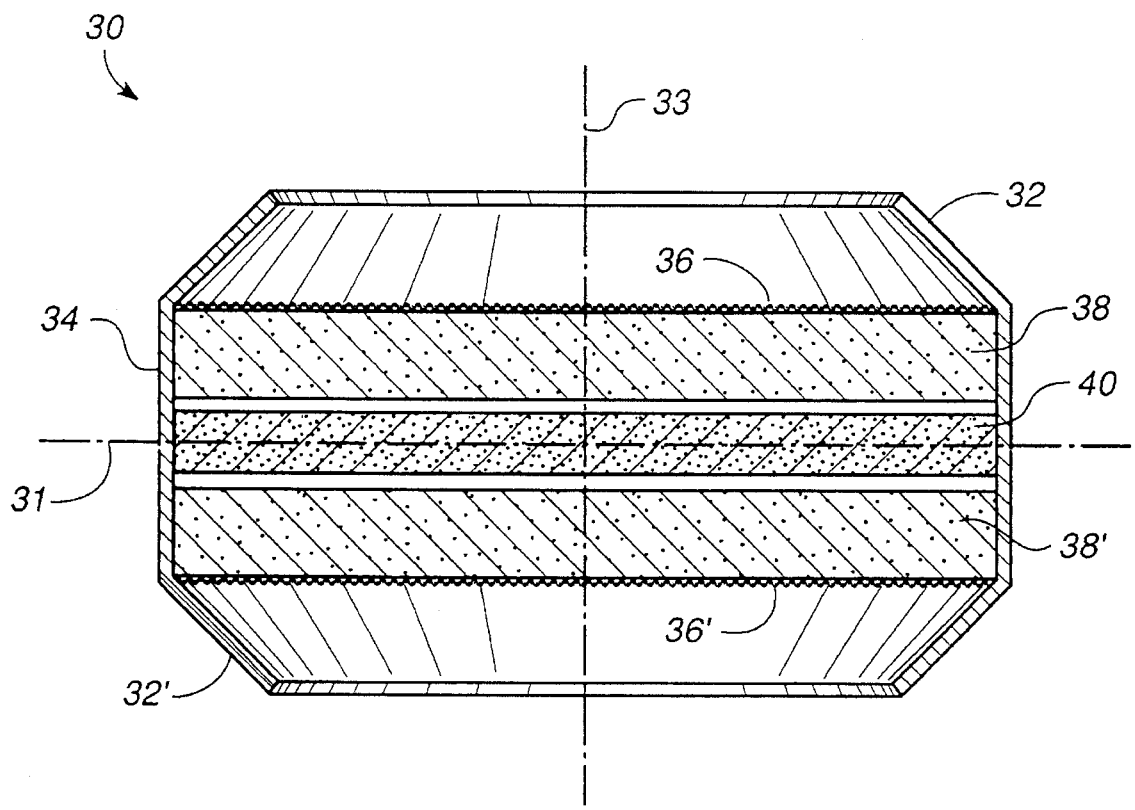
FIG. 2A illustrates an alternate embodiment of a device for maintaining a vacuum in accordance with the present invention.

In yet another embodiment, shown at 30 in FIG. 2A, the device of the invention includes both a central plane of symmetry 31 in addition to an axis of symmetry 33. In this embodiment, container 34 includes frustaconical portions 32 and 32' analogous to portions 12 and 26 of FIGS. 1 and 2 respectively. Within container 34 are arranged dryers 38 and 38' proximate the open ends of the container and getter material pellet 40 located in the central portion of the container, between dryers 38 and 38'. Netting 36 and 36' (analogous to netting 19 of FIG. 1) covers the outward facing surfaces of dryers 38 and 38' respectively. It will be appreciated that a similar embodiment of the device illustrated in FIG. 2 having an analogous plane of symmetry to that shown in FIG. 2A can be formed.

The pellet of getter material (e.g., first pellet 13 of FIG. 1) comprises a getter material, such as a Ba—Li alloy. In one embodiment, the Ba—Li alloy corresponds to the stoichiometric formula $BaAl_4$. The pellet of getter material is prepared from powders of the corresponding materials using standard methods. The particle size of the powders comprising the getter alloy is preferably between about 1.0 micrometers ($\mu m$) and about 1.0 mm, and, more preferably, between about 50 $\mu m$ and about 750 $\mu m$. It will be appreciated that pellets formed from larger particles may exhibit reduced specific surface area, and hence reduced sorption speeds, while pellets formed from smaller particles may undergo a degree of compaction during pelletization that is so great as to reduce the sorption speed to a value too low for practical use. In one embodiment, the pellet of getter material is located in the above-described container proximate to the closed end of the container.

The pellet of drying material (e.g., second pellet 15 of FIG. 1), also referred to herein as a "dryer", comprises a drying agent in addition to other optional components that may include a hydrogen abstracting agent and an anti-contraction agent. In one embodiment, the second pellet is located proximate to the open end of the above-described container. The drying agent according to one embodiment of the invention is an oxide chosen among the oxides of strontium, phosphorus and barium and their mixtures. In one embodiment, the drying agent is barium oxide (BaO). Other drying agents will be apparent to those of skill in the art.

According to one embodiment, the hydrogen abstracting agent is an oxide of a noble metal chosen from silver, osmium, iridium, ruthenium, rhodium or palladium. Additional hydrogen abstracting agent will be apparent to those having skill in the art. A preferred noble metal oxide is palladium oxide (PdO). The hydrogen abstracting agent converts trace amounts of hydrogen present in the thermal isolation jacket into water which is then sorbed by the drying agent, as described in the above-referenced PCT Application Serial No. WO 93/25843. In one embodiment, the weight ratio between the drying agent and the hydrogen abstracting agent is between about 5000:1 and about 10:1, preferably between about 1000:1 and about 100:1. The noble metal oxide may be present in the form of a loose powder or in a supported form. A method preparing a noble metal oxide in supported form is described, e.g., in the PCT Application Serial No. PCT/IT 94/00016 which is incorporated herein by reference.

The anti-contraction material prevents the dryer from contracting, e.g., following of the sorption of $H_2O$. Such materials include, inter alia, alumina ($Al_2O_3$), zeolites or activated carbon. Other agents will be familiar to those having skill in the art. It will be appreciated that zeolites and activated carbon also are capable of sorbing gases including $H_2O$ and organic gases. The weight ratio between the drying agent and the anti-contraction material in one embodiment can vary between about 100:1 and about 10:1.

The dryer can also be enclosed in a net of polymeric material, such as illustrated at 19 in FIG. 1. Alternatively, the dryer can be sandwiched between two discs of a material allowing an easy passage of gas, such as a screen, a gauze or a fabric, being made, e.g., of a metal wire or a polymeric material such as polyethylene. Such an embodiment is shown in FIG. 2 at 25 and 25'. The netting or discs retain any fragments than may become dislodged from the pellet during its formation or due to swelling caused, e.g., by water sorption. Other materials will be apparent to those of skill in the art. In the embodiment shown in FIG. 2, both discs are fixed to the circular surfaces of the pellet during its preparation by introducing in a press a first disc, the mixture of powders and the second disc, in this order, and compressing the discs and powders to embed the discs into the two surfaces of the pellet.

In dimensioning the device of the invention for maintenance of a vacuum in a thermally insulating jacket, the size of the jacket wherein the device is to be installed should be taken into account, in addition to the composition of the material forming the walls of the jacket and the composition of any insulating materials contained therein. In typical applications, such as, for example, maintaining a vacuum within the insulating panel of a refrigerator, the dryer comprises an oxide of a noble metal such as PdO and the material preventing compaction (e.g., alumina) together weighing between about 1.0 grams (g) and 5.0 g. The pellet of getter material (e.g., Ba—Li alloy) generally weighs between about 0.2 g and 1.5 g.

The pressures used to prepare the first and second pellets described above depends on the particle sizes of the powders to be compressed. The pressure should be at least enough to give the pellet mechanical stability (i.e., prevent crumbing of the pellet), but not so high to occlude substantially the inner porosity of the pellet which can reduce sorption speed. By employing powders having particle sizes in the above-indicated ranges, pressures for the preparation of the pellets can be between about 30 bar and about 1000 bar, preferably between about 150 bar and about 600 bar.

The pellet of getter material can be prepared separately and introduced into the container using standard methods. In one embodiment the pellet is a Ba—Li alloy formed locally in the lower portion of the container by introducing an appropriate quantity of powdered alloy into the lower portion and then compressing the powder by applying pressure in the range of between about 30 bar and about 1000 bar, preferably between about 150 bar and about 300 bar. This embodiment is illustrated in FIG. 2, wherein pellet 23 of getter material is not shown as a separate portion of the device. The determination of the appropriate amount of getter material and the type of getter material to be employed will depend generally on the interior volume of the jacket to be kept under vacuum and the nature of any materials in the jacket as well as the nature of the jacket itself. This determination will be apparent to those having skill in the vacuum container ans.

The pellet of drying material can be prepared separately and introduced in the upper portion of the container following the insertion of the pellet of getter material. In one embodiment, the dryer pellet includes a drying agent, e.g. BaO, to abstract water vapor; an oxide of a noble metal, e.g., PdO, to abstract hydrogen; and a material useful to prevent contraction of the dryer (e.g., alumina). The dryer is obtained by compressing powders of the constituents, the powders having particle sizes between about 10 μm and about 1000 μm. The pressure applied to the powders to compress the powders is typically between about 100 bar and about 1000 bar. Such compression provides a pellet having a conductivity that allows a sufficient sorption speed of the gases sorbed by the pellet of getter material. It will be appreciated, however, that the noble metal oxide and/or anti-compaction agent can be omitted from the dryer.

It has been found that the above-described features allow the device of the invention to be exposed to air for periods as long as about 15 minutes without becoming degraded to such a degree to impair its performances. Without wishing to be bound by theory, the formation of pellets from loose powders of Ba—Li getter alloys reduces the access speed at which gases are sorbed as compared to the loose powders, slowing the deterioration of the getter. However, the residual velocity is sufficient for the sorption of the gases entering the vacuum jacket during its operation. Thus, the devices of the invention can be exposed for air during the assembly of the vacuum jacket without losing effectiveness. This eliminates the need for special handling conditions and high-temperature activation procedures.

EXAMPLES

The following examples describe specific aspects of the invention to illustrate the invention and aid those of skill in the art in understanding and practicing the invention. These examples should not be construed as limiting the invention in any manner.

A container for pellets of both getter and drying materials was prepared by forming through cold-drawing a disc of aluminum sheet having a thickness of about 0.2 millimeters (mm). A container of cylindrical shape was obtained like that shown in FIG. 1 using standard methods. The container was about 4 mm high with an inner diameter of about 20 min.

A first pellet comprising about 0.5 g of a Ba—Li alloy powder having the stoichiometric formula $BaLi_4$, with a particle size of between about 50 micrometers (μm) and about 750 μm was prepared using standard methods and placed on the bottom of the container. The Ba—Li alloy powder was compressed onto the container bottom by a piston having the same diameter as the container at a pressure of about 500 bar. The alloy powder so compressed was about 1 mm in height. A second pellet comprising a mixture of about 2 g of BaO, having a particle size between about 100 μm and about 300 μm, and about 5 mg of PdO on a support of about 0.1 g of alumina, was also prepared using standard methods. The powders comprising the second pellet were compressed at about 800 bar and placed between two discs of polyethylene fabric. The pellet so obtained, having a diameter about equal to the inner diameter of the container and about 2 mm in height, was inserted in the container wherein the pellet of $BaLi_4$ was already present. Finally, the upper edge of the container was bent slightly inwardly to maintain the pellets substantially in position.

The completed device was placed in a chamber for measuring gas sorption, wherein the rate at which the gas was sorbed by the device (G) was measured as a function of the quantity of gas sorbed by the device (Q) using standard methods and materials. The measurements were carded out by admitting nitrogen into the chamber in successive batches of about 800 cubic centimeter (cc) each until a chamber pressure of about 0.27 millibar (mbar) was obtained. The pressure decrease in the chamber due to the sorption of the device was then measured. Following the measurement of the device as prepared, the device was exposed to air for about 15 minutes and the measurements described above were repeated.

Figure 3:
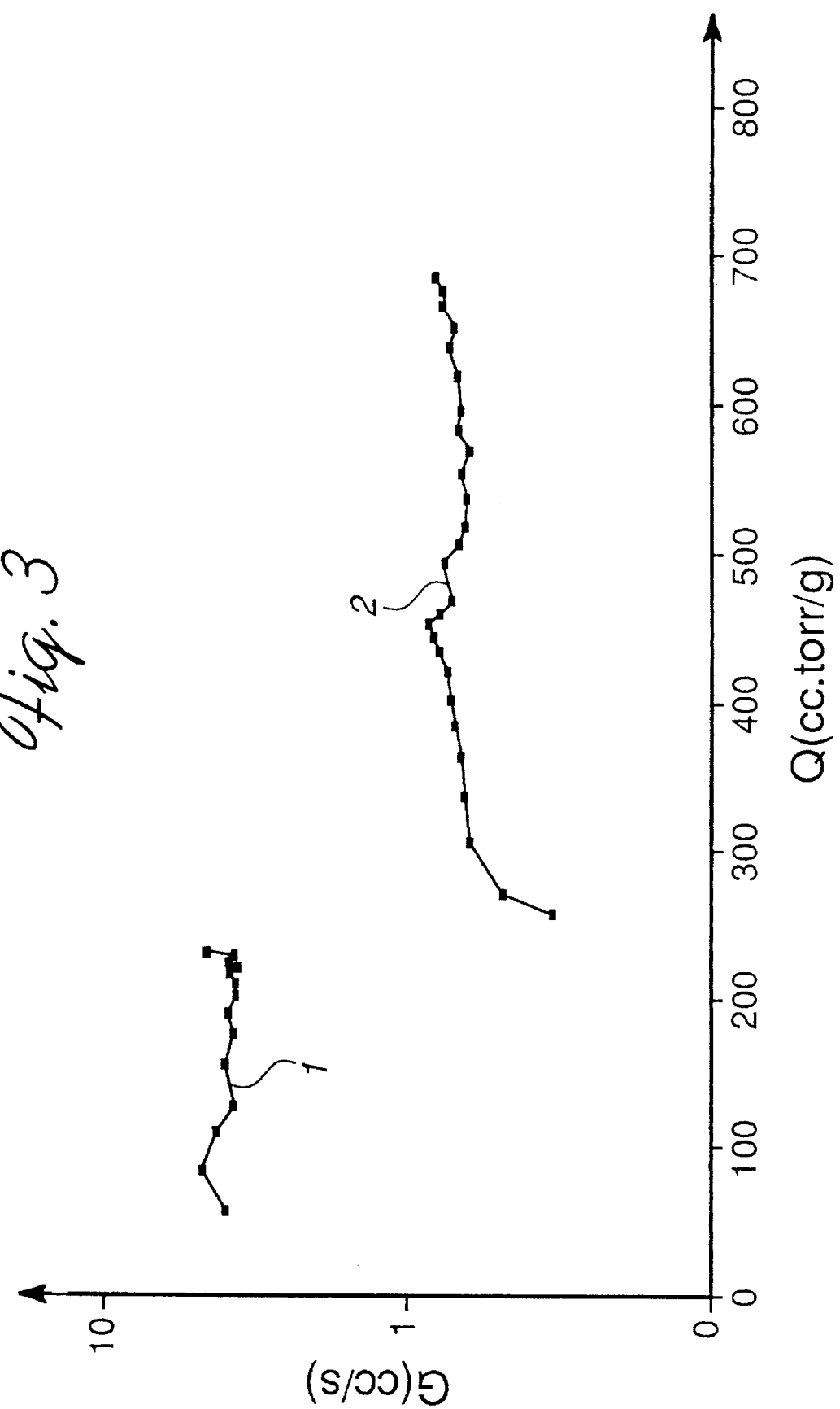
FIG. 3 shows in graphic form the results of the test described Example 1 below. The graph is a plot of the sorption speeds (G) of nitrogen in units of cubic centimeters/second (cc/s) as a function of the quantity (Q) of nitrogen sorbed in units of cubic centimeters. Torricelli/gram $$\left( \frac{cc \cdot torr}{g} \right)$$

FIG. 3 shows the sorption curves before exposure to air (curve 1) and after exposure to air (curve 2). As seen in FIG. 3, the device of the invention maintained a nitrogen sorption rate of about 5 cubic centimeter/second (cc/s) prior to exposure to air, and about 1 cc/s after exposure to air for about 15 minutes following a "rise period" which is indicated on the portion of curve 2 between about Q=240 cc.torr/g and Q=300 cc.torr/g.

The results reported in FIG. 3 indicate that the device of the present invention is well suited for large-scale commercial applications, e.g., in the thermal insulation panels of refrigerators. A typical thermal isolation panel having a size of about 7,500 cc, made with rigid polyurethane having open cells and a housing of aluminum/polyethylene multilayer, and wherein the permeation takes place exclusively in the zone of welding on polyethylene, shows a permeation rate of about $10^{-4}$ mbar.cc/s. Such a thermal isolation panel will maintain its insulating characteristics until the interior pressure of the panel exceeds about 0.1 mbar. Consequently, a device for maintaining a vacuum must provide a sorption rate greater than about $10^{-3}$ cc/s to maintain the thermal insulation properties of the refrigerator insulation panel. As illustrated in FIG. 3, the device of the invention, even after exposure to air, provides a sorption speed that is about 1000-fold greater than the permeation rate of a typical refrigeration panel.

The above-described experiment was also performed for the case in which the device of the invention was exposed to air for periods of about 30 minutes and about 40 minutes. Again, acceptable performance was found in both cases, although the above-described "rise period" in the sorption rate curve was found to lengthen with increasing exposure time.

From the foregoing it will thus be appreciated that the present invention provides a device for maintaining the vacuum within an evacuated container, and especially a thermally insulating jacket. In addition to its ability to maintain a vacuum state, the device of the invention will be seen to offer the advantages of maintaining a useful pumping speed even upon exposure to air, thus eliminating the need for expensive and cumbersome handling equipment and procedures. Furthermore, the devices of the present invention do not require thermal activation, thus removing the limitations on the use of getter devices to maintain vacuums with certain insulating jacket materials present with existing materials and methods. Those of skill in the art will appreciate that the present invention provides still more advantages beyond those enumerated herein.

Although certain embodiments and examples have been used to describe the present invention, it will be apparent to those having skill in the art that various changes can be made to those embodiment and/or examples without departing from the scope or spirit of the present invention. For example, it will be appreciated from the foregoing that other getter materials can be employed with the device of the present invention. Also, the dryer can include different combinations of materials including at least one drying agent, hydrogen abstracting agent and anti-contraction material. In addition, devices in accordance with the present invention can be formed wherein the pellets are held within the container using a retaining means other than frustaconical container portion. For example, one or more impediments to movement, such as a ledge running at least partially along the circumference of the interior wall of the container, can be used to impede movement of the pellets contained within the container. Still more variations will be apparent to those having skill in the art.

What is claimed:

1. A method for manufacturing a device for maintaining a vacuum, comprising the steps of:
    a) providing a substantially gas-impermeable container having open and closed ends;
    b) compressing a powder including a Ba—Li getter alloy at a pressure of between about 30 bar and about 1000 bar to form a first pellet;
    c) locating said first pellet in said container proximate to said closed end; and
    d) locating a second pellet including a drying agent in said container proximate to said open end such that said second pellet covers substantially said first pellet;
    whereby said device is capable of maintaining a nitrogen sorption rate of at least about one cubic centimeter/second after exposure to air for fifteen minutes.

2. The method of claim 1, wherein said pressure is between about 150 bar and about 300 bar.

3. The method of claim 2, wherein said first pellet is an alloy having the stoichiometric formula $BaLi_4$.

4. The method of claim 3, wherein said first pellet comprises a powder of $BaLi_4$ particles between about 1.0 µm and about 1000 µm in size.

5. The method of claim 4, wherein said drying agent is selected from the group consisting of barium oxide, strontium oxide and phosphorus oxide and their mixtures.

6. The method of claim 5, wherein drying agent comprises a powder of drying agent particles between about 10 µm and about 1000 µm in size.

7. The method of claim 6, wherein said drying agent is barium oxide.

8. The method of claim 5, wherein said second pellet further includes a noble metal oxide selected from the group consisting of silver oxide, osmium oxide, iridium oxide, ruthenium oxide, rhodium oxide and palladium oxide.

9. The method of claim 8, wherein the ratio by weight between said drying agent and said noble metal oxide is between 5000:1 and 10:1.

10. The method of claim 5, wherein said second pellet further includes an anti-contraction agent selected from the group consisting of alumina, zeolites and activated carbon.

11. The method of claim 10, wherein said anti-contraction agent is alumina.

12. A device for maintaining a vacuum in an enclosed space, comprising:
    a) a substantially gas-impermeable container having open and closed ends,
    b) a first pellet formed of a getter material including a Ba—Li alloy, said first pellet being located in said container proximate to said closed end; and
    c) a second pellet including a drying agent, a noble metal oxide selected from the group consisting of silver oxide, osmium oxide, iridium oxide, ruthenium oxide, rhodium oxide and palladium oxide, and an anti-contraction agent selected from the group consisting of alumina, zeolites and activated carbon, said second pellet being located in said container proximate to said open end, and said second pellet covering substantially said first pellet;
    wherein said device is capable of maintaining a nitrogen sorption rate of at least about one cubic centimeter/second after exposure to air for fifteen minutes.

13. The device of claim 12, wherein said anti-contraction agent is alumina.

14. A device for maintaining a vacuum in an enclosed space, comprising:
    a) a substantially gas-impermeable container having open and closed ends,
    b) a first pellet formed of a getter material including a Ba—Li alloy, said getter material comprising a compressed powder formed by compression of a powder of said getter material at a pressure between about 30 bar and about 1000 bar, said first pellet being located in said container proximate to said closed end; and
    c) a second pellet including a drying agent, said second pellet being located in said container proximate to said open end, and said second pellet covering substantially said first pellet;
    wherein said device is capable of maintaining a nitrogen sorption rate of at least about one cubic centimeter/second after exposure to air for fifteen minutes.

15. The device of claim 14, wherein said pressure is between about 150 bar and about 300 bar.

* * * * *